United States Patent [19]

Ducker, III et al.

[11] Patent Number: 5,294,021
[45] Date of Patent: Mar. 15, 1994

[54] UNDERWATER AIR DISCHARGE LOBSTER TICKLER AND METHOD

[76] Inventors: Andrew L. Ducker, III, 9604 NW. 28th St., Coral Springs, Fla. 33065; Gary D. Dalton, 620 Aspen Rd., West Palm Beach, Fla. 33409

[21] Appl. No.: 856,242

[22] Filed: Mar. 25, 1992

[51] Int. Cl.$^5$ .............................................. B67D 5/00
[52] U.S. Cl. ........................................ 222/3; 222/79; 222/399; 239/562; 239/566; 239/567; 239/568; 285/316; 285/318
[58] Field of Search ............... 222/3, 79, 394, 399, 222/568; 239/390, 600, 562, 566, 567, 568; 285/316, 317, 318; 124/1, 55; 419/204

[56] References Cited

U.S. PATENT DOCUMENTS

| | | | |
|---|---|---|---|
| 1,593,883 | 7/1926 | Segelhorst | 285/317 |
| 2,529,499 | 11/1950 | Jankelson | 239/568 X |
| 2,596,191 | 5/1952 | Windhom, Jr. | 239/568 X |
| 3,844,449 | 10/1974 | Alter | 222/399 X |
| 4,647,081 | 3/1987 | Landgraf et al. | 285/317 X |
| 4,809,744 | 3/1989 | Bhat | 239/566 X |
| 4,848,670 | 7/1989 | Belanger et al. | 239/566 X |
| 4,919,334 | 4/1990 | Hartmann et al. | 239/600 |
| 5,116,086 | 5/1992 | Psajd | 285/316 X |

FOREIGN PATENT DOCUMENTS

| | | | |
|---|---|---|---|
| 0079274 | 5/1983 | European Pat. Off. | 285/317 |
| 2617620 | 11/1977 | Fed. Rep. of Germany | 285/316 |

Primary Examiner—Andres Kashnikow
Assistant Examiner—J. A. Kaufman
Attorney, Agent, or Firm—Frank L. Kubler

[57] ABSTRACT

A compressed air safety gun for use underwater, having a handle and an elongate barrel extending therefrom, the handle including a valve therein being operable between open and closed position, by a trigger on the handle. A substantially flexible pneumatic hose connects at opposite ends between the handle and a pressurized air supply source for directing pressurized air flow to the valve in the handle, wherein operation of the trigger to open valve serves to direct the flow of pressurized air through the gun barrel and out from a distal end thereof. A coupling connectable to the distal end of the barrel is structured and disposed for attachment of various tools thereto, such as a nozzle for directing the flow of air from the barrel end.

17 Claims, 4 Drawing Sheets

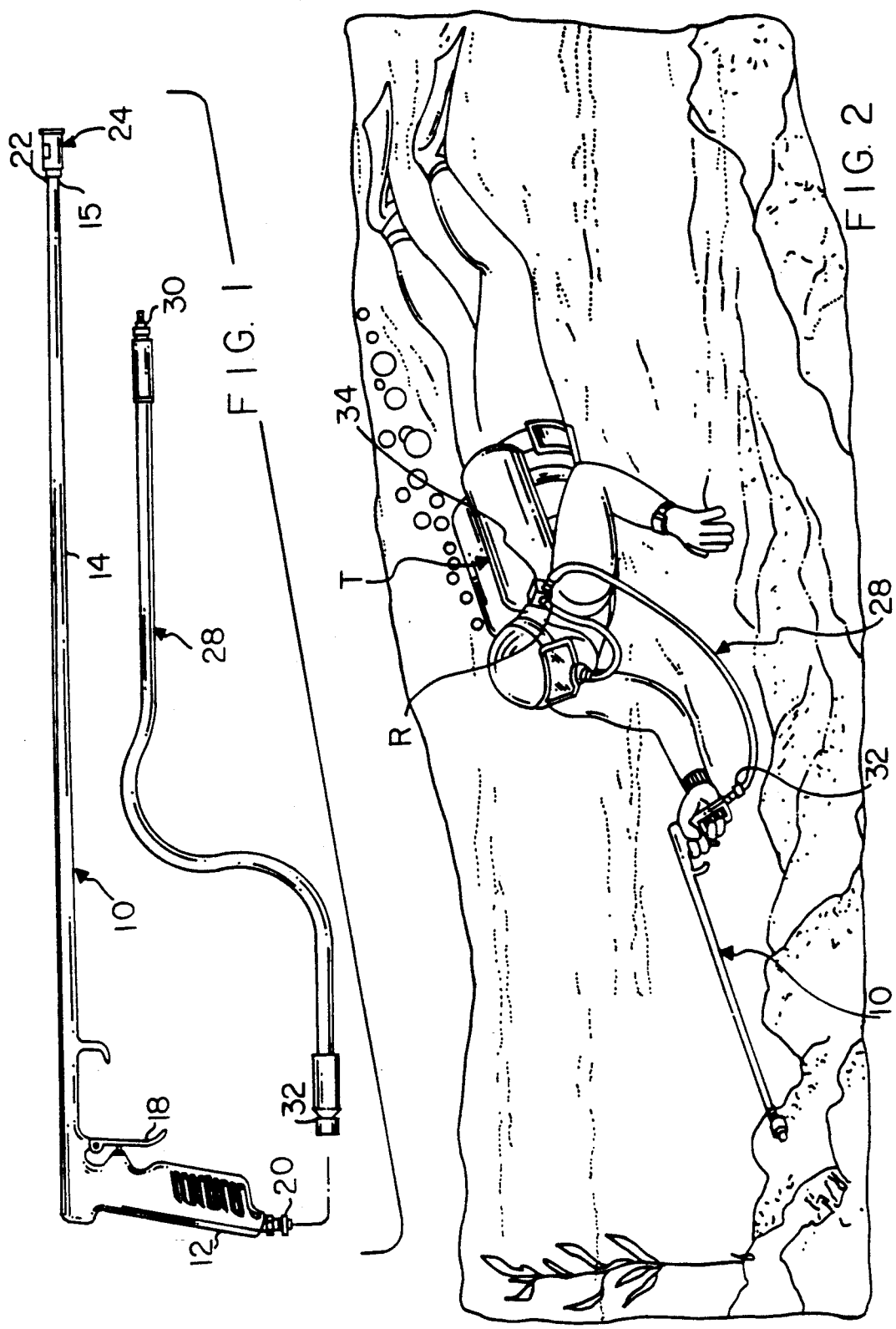

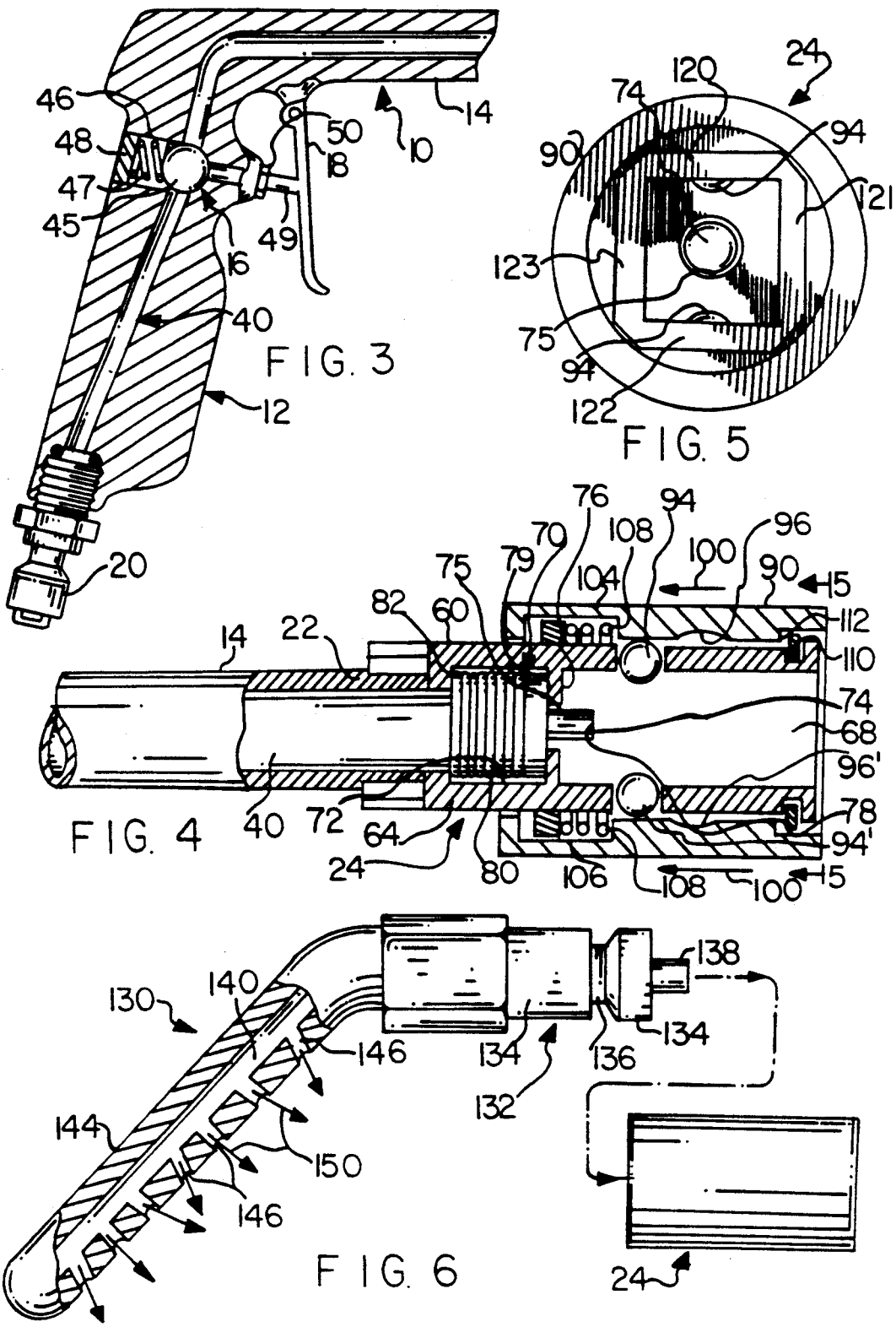

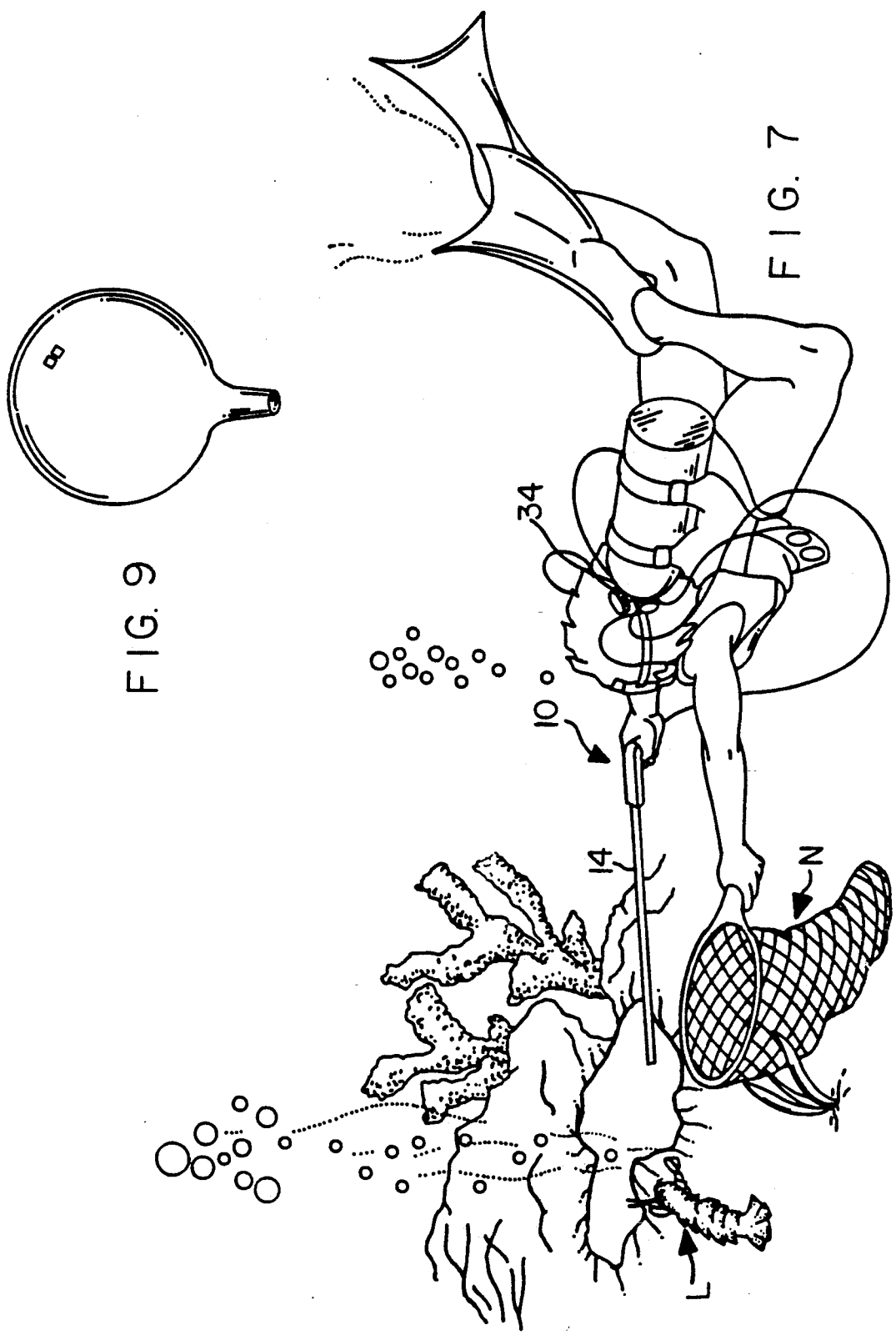

UNDERWATER AIR DISCHARGE LOBSTER TICKLER AND METHOD

BACKGROUND OF THE INVENTION

1. Field of the Invention

This invention relates to an underwater compressed air safety gun for use by scuba divers or others swimming underwater. Since scuba divers or other underwater swimmers carry their own source of compressed air for breathing, it is convenient for an underwater air safety gun to operate directly from such source of compressed air, connecting the air gun to the first stage of a regulator extending from a compressed air tank. The underwater air gun is provided with a coupling device at its distal end for the attachment of various tools, such as a nozzle to direct the flow of the pressurized air. A diver can use the underwater air safety gun, for example, to assist with harvesting lobsters; by inserting its distal end and a portion of its barrel into a lobster's hiding place, by releasing some pressurized air therein and by thus frightening the lobster out of hiding.

2. Description of the Prior Art

It has long been known that in tropical waters, divers have a difficult time catching lobsters, which swim into and under large corals for hiding and protection. It currently is a common practice for scuba divers, in an attempt to startle the lobster out of hiding, to remove from their mouths, the mouth piece and regulator of the scuba diving gear attached to the diver's air supply and while holding the regulator, to insert the mouth piece into the hiding spot and release pressurized air, thereby creating noise and turbulence. Often, the lobster is scared by the noise and the bubbles and as a result, will move out of its hole; it can then be more easily caught by the diver. However, such activity can be dangerous. First, it is possible for the mouth piece to become lodged inside the rocky surfaces of some lobster holes, which would thereby leave the diver underwater without any air supply source. Second, the diver, by inserting his hand and the mouth piece into the hiding spot to release the air, could be cut by a rocky surface or bitten by an organism living therein such as eel, resulting in injury to the diver. Alternatively, it is also common for some divers to apply sodium hypochlorite or chlorine bleach to some lobster holes in order to drive the lobster out of hiding. However, this practice causes irreparable damage to coral reefs and severe injury if not death to fish and other organisms living in the coral or among the reefs.

Accordingly, it is a primary object of this invention to present an underwater air safety gun which is connected to a compressed air supply such as carried by a scuba diver which can be easily carried and further, which can be used to assist the diver with harvesting lobster more safely and less harmful than which is common practice.

A further object of the invention is to provide for a coupling device at the distal end of the underwater compressed air safety gun so that other types of attachments, aside from a device that releases and directs pressurized air, can also be used. For example, a device which can be used by a diver to inflate an object such as an emergency buoy which once inflated could rise to the surface to alert or warn someone that the diver is in danger. Additionally, other tools such as a knife, screwdriver, fish prongs, and the like can be attached to the end of the gun barrel.

A further object of the invention is to present an underwater air safety gun which is of simple and lightweight construction but which is also durable and dependable and yet which may be produced at a moderate cost.

These and other objects of the present invention are accomplished by an underwater air safety gun which has a long gun barrel having at one of its ends, handle means attached thereto, and where the distal end of the handle means is provided with means to be pneumatically attached to a hose that also attaches pneumatically to the diver's tank, through which the supply of pressurized air must pass into the underwater air safety gun. The handle means also provides for valve means, operable by hand, to allow the pressurized air to pass through the valve and through the gun barrel. The distal end of the gun barrel is provided with a coupling device to which a nozzle can be attached to release the pressurized air and direct the path of its flow.

Other objects, features and advantages of the invention shall be apparent as the description hereof proceeds and when considered in connection with the accompanying illustrative drawings.

BRIEF DESCRIPTION OF THE DRAWINGS

For a fuller understanding of the nature of the present invention, reference should be had to the following detailed description taken in connection with the accompanying drawings in which:

FIG. 1 is a side elevation view of the underwater compressed air safety gun of the present invention, and the pneumatic hose which attaches at one end pneumatically to the distal end of a handle of the underwater air gun and which pneumatically attaches at its other end to the first stage of a regulator extending from a diver's air tank.

FIG. 2 is a stylized view of a scuba diver utilizing the underwater air safety gun of the present invention.

FIG. 3 is an isolated view in cross section of the handle of the air gun illustrating a valve and trigger assembly therein.

FIG. 4 is an isolated view in partial section illustrating a coupling device of the present invention attached to a distal end of the barrel of the air gun.

FIG. 5 is an end view of the coupling device taken along the plane indicated by arrows 5—5 of FIG. 4.

FIG. 6 is an exploded view in partial section illustrating attachment of a lobster tickler air nozzle of the present invention to the coupling device.

FIG. 7 is a stylized view of a scuba diver utilizing the underwater air safety gun and the lobster tickler air nozzle attached thereto to drive a lobster from a coral reef structure.

FIG. 9 is a perspective view of the inventive signalling buoy device.

For a fuller understanding of the present invention, reference should be had to the following detailed description wherein like reference numerals refer to like parts throughout the several views of the drawings.

DETAILED DESCRIPTION OF THE PREFERRED EMBODIMENT

Figure 8:
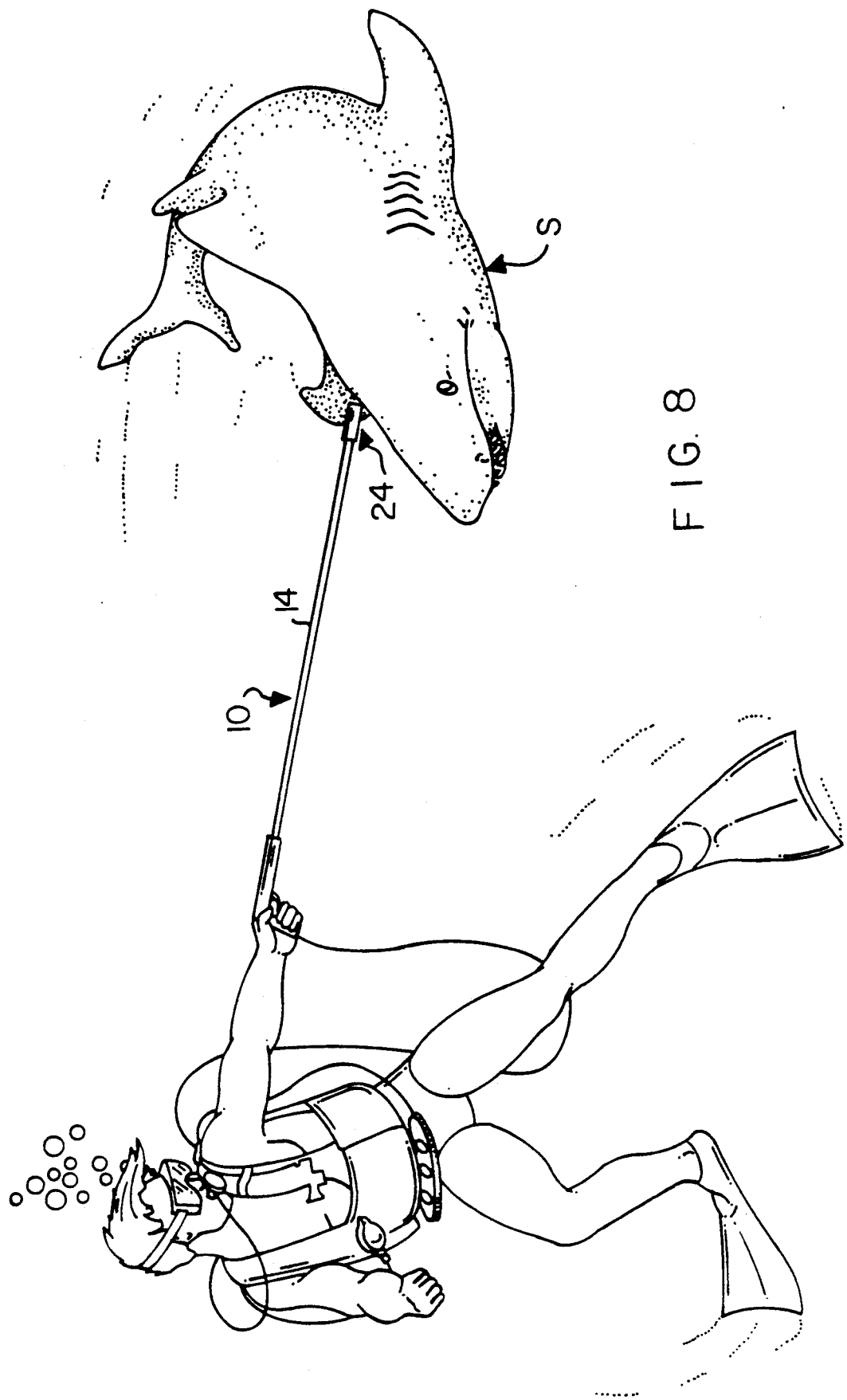
FIG. 8 is a stylized view of a scuba diver utilizing the underwater compressed air safety gun as a defensive mechanism to ward off an approaching shark.

Referring now to the drawings, there is shown in FIG. 1 an underwater air safety gun 10 with handle 12 and an elongated hollow gun barrel 14. The handle 12 provides for a valve means 16 which is operable between an open and closed position by a trigger 18. At the distal end of the handle is a pneumatic attachment means 20 for connection of a high pressure hose 28 thereto, as further illustrated in FIG. 3. Referring to FIG. 1, it can be seen that the high pressure hose 28, through which the pressurized air passes, includes pneumatic attachments at both ends, 30 and 32, structured to provide an air tight interconnection to the handle of the safety gun, as at 20, and to the first stage of a regulator on the diver's air tank, as at 34 in FIG. 2. The pneumatic attachment at end 32 is a standard pneumatic female coupling which is releasably attachable to a male fitting 20 on the distal end of the handle 12.

The distal end 15, of the gun barrel 14, includes thereon threading 22 for threaded attachment of a coupling device 24, thereto. The coupling device 24 is structured to facilitate attachment of various tools and accessories to the distal end of the gun barrel, such as a lobster tickler nozzle 130 as shown in FIG. 6, to direct the flow of the pressured air in a multi-directional manner, thereby creating turbulence which is ultimately effective in frightening lobsters out from common hiding locations such as in coral reefs and caves.

Referring to FIG. 2, the attachment of the hose 28 to both the underwater air safety gun 10 and the regulator R extending from the diver's tank T is shown where it can also be seen that the hose 28 is of a predetermined length sufficiently long enough to meet its intended purpose yet short enough to prevent entanglement of the diver.

An air flow path generally indicated as 40 extends from the male pneumatic fitting 32, through the handle 12, and axially through the gun barrel 14 to the coupling device attached to the distal end 15 of the gun barrel 14. A valve means 16 is provided in the handle 12 being structured to be normally in a closed position, thereby blocking the passage of pressurized air through the air flow path 40 into the gun barrel 14. In the preferred embodiment, the valve means includes a ball 45 which is movably positionable within a channel 46 extending transversely across the air flow path 40. A spring 47 fitted between the ball 45 and a wall 48 of the casing of the handle 12 urges the ball into the normally closed position in blocking relation to the air flow path 40. A plunger 49 attached to the trigger 18 extends through a water and air tight seal 50 and into abutting engagement with the ball 45 opposite the spring 47. Upon applying pressure to the trigger 18, in a manner which causes the trigger to move toward the handle 12, the plunger 49 forces the ball 45 against the spring 47 moving the ball 45 along channel 46 and out of blocking relation to the air flow path 40, thereby defining an open position. In this manner, pressurized air supplied to the male pneumatic fitting 32 is directed through the air flow path 40 to the coupling device 24 on the distal end 15 of the gun barrel 14.

Referring to FIG. 4, the coupling device 24 is illustrated in cross section and includes a central housing 60 which, in the preferred embodiment, is threadably attachable to the distal end 15 of the gun barrel 14. The central housing 60 includes an air valve chamber 64 and an adjacent tool socket 68 which is structured and disposed for receipt of an end of a tool therein.

Within the air valve chamber 64, there is a needle valve assembly 70 which is operable between an open position and a closed position. The needle valve assembly 70 is normally disposed in the closed position, thereby blocking the passage of pressurized air flow into the tool socket 68. The needle valve assembly includes a base plate 72 having a hollow needle 74 attached thereto and extending perpendicularly therefrom and through an aperture 75 disposed centrally through a dividing wall 76 between the tool socket 68 and air valve chamber 64. The needle 74 includes a hole 78 extending transversely through a side thereof in fluid communication with a hollow axial bore extending therethrough. A rubber seal 79 is fitted about the needle 74 adjacent the base plate 72 so as to provide an air tight seal between the base plate 72 and the dividing wall 76 when the valve assembly 70 is in the closed position, thereby preventing pressurized air flow through the aperture 75. A spring 80 is fitted between the base plate 72 and a shoulder 82 at an opposite end of the air valve chamber 64. The spring 80 is structured and disposed to force the base plate 72 and seal 79 against dividing wall 76 such that the needle 74 extends through the aperture 75 and into the tool socket 68, with the valve assembly 70 in the closed position. If desired, the distal end of a tool to be inserted within the tool socket 68 may include means thereon to force the needle 74 inwardly against the spring 80 such that the hole 78 in the needle 74 is positioned within the air valve chamber 64 with the seal 79 separated from a normally seated position against the dividing wall 76. In this manner, pressurized air flow from the air flow path 40 will be directed around the base plate 72 and seal 79 through hole 78 and the axial bore extending through the needle 74, and exiting into the tool socket 68 or means on the distal end of a tool fitted therein.

A collar 90 is co-axially fitted about the central housing 60 of the coupling device 24 and is telescopically movable a predetermined distance relative to the central housing 60. A pair of bearings 94, 94' are provided within a side wall structure of the central housing 60 and are structured and disposed therein so as to partially protrude within the tool socket 68. An inner surface of the collar 90 includes concave recessed portions 96, 96' on opposite sides thereof, wherein movement of the collar 90 in the direction of arrows 100, serves to position the recessed portions 96, 96' adjacent corresponding bearings 94, 94' allowing movement of the bearings 94, 94' into the recessed portions 96, 96' and out from a partially protruding position within the tool socket 68, facilitating insertion of a tool therein. A spring 104 is fitted about the central housing 60 in abutting engagement with a stop element 106 fixedly attached to the outer wall structure of the central housing 60 and a confronting shoulder portion 108 on the inner surface of the collar 90. The spring 104 is structured and disposed to urge the collar 90 opposite the direction of arrows 100 such that the bearings 94, 94' are forced into a partially protruding position within the tool socket 68. A snap ring 110 is fitted about the outer wall structure of the central housing 60 near a distal end thereof being structured and disposed to abut a correspondingly positioned shoulder portion 112 of the collar 90, thereby providing a stop means preventing further movement of the collar 90 in a direction opposite of the arrows 100 due to the force exerted by spring 104.

In the preferred embodiment, the central housing 60 includes four side walls 120, 121, 122, and 123 defining a multi-sided interior wall surface within the tool socket 68, having a generally square configuration, as best seen in FIG. 5. In this manner, a tool having a congruently configured distal end can be fitted within the tool socket 68 such that the multi-sided interior wall configuration of the tool socket is disposed in generally abutting relation with corresponding sides of the distal end of the tool, thereby preventing rotation of the attached tool relative to the coupling device 24 and gun barrel 14.

A lobster ticker nozzle device 130 is shown in FIG. 6 and includes a distal end portion 132 being structured and configured for receipt within the tool socket 68 of the coupling device 24. The distal end 132 of the nozzle device 130 includes flat surface portions 134 on four sides thereof, being configured to generally abut corresponding interior surfaces of walls 120, 121, 122, and 123 within the tool socket 68 of the central housing 24. A notched portion 136 about the distal end 132 is structured and disposed for blocking receipt of the bearings 94, 94' therein, thereby providing a fixed, yet releasable attachment of the distal end 132 within the tool socket 68. A hollow stem 138 extends from the distal end portion 132, being structured and disposed for engagement with the needle 74 once distal end portion 132 is locked within tool socket 68, thereby forcing the needle valve assembly 70 in an open position and directing pressurized air flow through the hollow stem 138 and through an air channel 140 within the nozzle device 130.

The nozzle device 130 includes a stem portion 144 defining a lobster tickler stick extending angularly from a remainder of the device. A plurality of nozzle apertures 146 are provided along the length of the stem 144 in fluid communication with the air passage channel 140. The nozzle apertures 146 are angled with respect to one another in a manner so as to direct air flow therefrom in a multi-directional manner, as indicated by arrows 150.

The structure of the underwater compressed air safety gun 10 and attached coupling device 24 allow for adaptation to a variety of different uses, the need for which may arise in various diving situations. For example, when harvesting lobsters from deep holes in coral reefs and other similar environment, the shape and structure of the gun barrel 14 and attached lobster tickler air nozzle 130 enable a diver to safely drive a lobster from within the reef without endangering the reef, surrounding sea life, or the diver. As seen in FIG. 7, a diver can easily handle the air safety gun 10 with one hand, maneuvering the tickler 130 through a hole in the reef. Once in position, the trigger is easily squeezed ejecting air bubbles which effectively drive the lobster L from its hiding place, at which point the diver can position a handheld net N to catch the lobster.

In another situation, the underwater compressed air safety gun can be used defensively to ward off aggressive sea creatures, as seen in FIG. 8. The elongate gun barrel 14 is especially useful in the situation, enabling the diver to distance himself from an aggressive sea creature, such as a shark S. If the aggressiveness persists to the point where it becomes a life-threatening situation, a power head (such as a 0.357 magnum power head commonly used on a defensive instrument known as a Bang Stick) may be quickly attached to the coupling device 24, whereupon striking the shark with the power head actuates firing a bullet or like projectile therefrom, killing or crippling the attacking creature.

Now that the invention has been described,
What is claimed is:

1. An apparatus for exciting and driving lobsters from recesses and other hiding places under water, comprising:
   an air source,
   an air hose for delivering air from said air source,
   an air gun comprising an air conduit having coupling means for attachment to said air hose and a valve for controlling air flow through said air conduit,
   an air gun lobster exciting structure comprising a member containing an air passageway into which air from said air source is delivered through said air conduit when said air gun valve is opened, an outer surface and a plurality of exit ports extending from said air passageway to said outer surface, for insertion into a recess in which a lobster is located and discharging air to excite and drive said lobster out of said recess; wherein said air source is a scuba compressed air tank having a regulator with a first stage having a high pressure end and a low pressure end, and said air hose is coupled to said low pressure end for safer and more measured air discharge.

2. The apparatus of claim 1, wherein said lobster exciting structure is removably coupled to said air gun.

3. The apparatus of claim 2, additionally comprising:
   a signal buoy attachment comprising an inflatable balloon for inflation and release to the water surface, which couples to said air gun to receive air from said air source and thereby become inflated.

4. The apparatus of claim 1, wherein said lobster exciting structure is elongate and essentially tubular and has an air receiving end and a remote end.

5. The apparatus of claim 4, wherein said lobster exciting structure is essentially rectilinear and said plurality of exit ports are spread essentially axially along said structure.

6. The apparatus of claim 5, wherein said lobster exciting structure is bent into an obtuse angle.

7. The apparatus of claim 4, wherein said exit ports are located periodically along the longitudinal axis of said lobster exciting structure, and said exit ports are bored at angles to be progressively oriented toward said structure remote end.

8. The apparatus of claim 7, wherein said air gun comprises a gun barrel portion having a remote barrel end wherein said structure couples to said remote barrel end.

9. The apparatus of claim 8, wherein said gun barrel portion tapers toward said remote barrel end to fit more readily into recesses where lobsters may hide.

10. The apparatus of claim 1, wherein said air gun comprises:
    a gun barrel having a first end and a second end, said second end being open, said gun barrel including an axial bore extending therethrough and defining a barrel air flow path from said first end to said second end,
    handle means extending from said first end of said gun barrel, including an upper portion and a lower portion, said handle means including a handle air flow path being structured to allow air flow therethrough between said upper and lower portions, and being in fluid communication with the barrel air flow path adjacent said first end,
    valve means in said handle means movable between an open and a closed position by an interconnected exteriorly operable trigger means, said valve means being adjacent said first end of said barrel and being structured and disposed to permit air flow through said handle means into said barrel and to said second open barrel end upon operation thereof to said open position, coupling attachment means on said second end of said gun barrel to provide for the attachment of a coupling device, to which various tools can be connected, a pneumatic hose having an upstream end and a downstream end, handle connector means including mutually interchangeable portions on said hose downstream end and said lower portion of said handle means effective for fluid flow, air tight connection of said hose to said lower portion of said handle means, and air supply connector means on said upstream end of said hose for interconnection with said air supply tank.

11. The apparatus of claim 10, wherein said air gun coupling attachment means comprises:

a central housing including a side wall structure disposed in substantially surrounding relation to an air valve chamber in fluid communication with said gun barrel and an adjacent tool socket, said air valve chamber including means for receipt of pressurized air therein, said tool socket including an interior side wall surface having a multi-sided configuration structured and disposed for attached receipt of a congruently configured proximal end of said tool in fixed, non-rotating relation therein, locking means to maintain the proximal end of said tool in locked position within said tool socket, and valve means within said air valve chamber operable between an open and a closed position, said valve means being structured and disposed to permit flow of said pressurized air from said air valve chamber into said tool socket and into said tool upon operation thereof to said open position, said valve means being normally disposed in said closed position blocking the flow of said pressurized air into said tool socket.

12. A pneumatic coupling as recited in claim 11 wherein said central housing includes a dividing wall extending transversely between said side wall structure in separating relation between said air valve chamber and said adjacent tool socket.

13. A pneumatic coupling as recited in claim 12 wherein said valve means includes a needle valve assembly disposed within said valve chamber and including a base plate and a needle portion extending substantially perpendicular to a first side thereof, said needle portion being structured and disposed to extend axially through a central aperture formed in said dividing wall.

14. A pneumatic coupling as recited in claim 13 wherein said valve means further includes a valve seal fitted about said needle portion, in adjacent, overlying relation to said first side of said base plate, said valve seal being structured and disposed to abut said dividing wall within said valve chamber in sealing relation to said central aperture formed therethrough, when said means is in said closed position.

15. A method of driving a lobster from a recess using an air source coupled to an air delivery hose, and an air diffusing discharge structure containing an air passageway and coupled to said air delivery hose, having a plurality of air exit ports extending from said air passageway, and valve means for controlling the flow of air from said air delivery hose into said air diffusing discharge structure, comprising the steps of:

inserting said air diffusing discharge structure into said recess, opening said valve means to release air into said passageway and out of said structure through said exit ports.

16. An air safety gun to be connected to a pressurized air supply tank, said gun being for underwater use, comprising:

a gun barrel having a first end and a second end, said second end being open, said gun barrel including an axial bore extending therethrough and defining a barrel air flow path from said first end to said second end, handle means extending from said first end of said gun barrel, including an upper portion and a lower portion, said handle means including a handle air flow path being structured to allow air flow therethrough between said upper and lower portion, and being in fluid communication with said barrel air flow path adjacent said first end, valve means in said handle means movable between an open and closed position by an interconnected exteriorly operable trigger means, said valve means being adjacent said first end of said barrel and being structured and disposed to permit air flow through said handle means into said barrel and to said second open barrel end upon operation thereof to said open position, coupling attachment means on said second end of said gun barrel to provide for the attachment of a coupling device, to which various tools can be connected, a pneumatic hose having an upstream end and a downstream end, handle connector means including mutually interchangeable portions on said hose downstream end and said lower portion of said handle means effective for fluid flow, air tight connection of said hose to said lower portion of said handle means, and air supply connector means on the upstream end of said hose for interconnection with said air supply tank; wherein said air gun coupling attachment means comprises:

a central housing including a side wall structure disposed in substantially surrounding relation to an air valve chamber in fluid communication with said gun barrel and an adjacent tool socket, said air valve chamber including means for receipt of pressurized air therein, said tool socket including an interior side wall surface having a multi-sided configuration structured and disposed for attached receipt of a congruently configured proximal end of said tool in fixed, non-rotating relation therein, locking means to maintain the proximal end to said tool in locked position within said tool socket, and valve means within said air valve chamber operable between an open and a closed position, said valve means being structured and disposed to permit flow of said pressurized air from said air valve chamber into said tool socket and into said tool upon operation thereof to said open position, said valve means being normally disposed in said closed position blocking the flow of said pressurized air into said tool socket, wherein said central housing includes a dividing wall extending transversely between said side wall structure in separating relation between said air valve chamber and said adjacent tool socket, and wherein said valve means includes a needle valve assembly disposed within said valve chamber and including a base plate and a needle portion extending substantially perpendicular to a first side thereof, said needle portion being structured and disposed to extend axially through a central aperture formed in said dividing wall.

17. A pneumatic coupling as recited in claim 16 wherein said valve means further includes a valve seal fitted about said needle portion, in adjacent, overlying relation to said first side of said base plate, said valve seal being structured and disposed to abut said dividing wall within said valve chamber in sealing relation to said central aperture formed therethrough, when said means is in said closed position.

* * * * *